United States Patent

Bruette

(10) Patent No.: US 6,708,336 B1
(45) Date of Patent: *Mar. 16, 2004

(54) METHOD OF AND APPARATUS FOR GENERATING AND SEARCHING A DATABASE

(75) Inventor: Jeffrey Scott Bruette, Sausalito, CA (US)

(73) Assignee: Hughes Electronics Corporation, El Segundo, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/696,295

(22) Filed: Aug. 13, 1996

(51) Int. Cl.[7] .......................... G06F 3/00; G06F 13/00; H04N 5/50
(52) U.S. Cl. .......................... 725/57; 725/39; 725/44; 725/45; 725/46; 725/53; 348/731; 348/732; 348/570
(58) Field of Search .................. 345/327; 348/1, 348/10, 11, 12, 13, 731, 732, 906, 734, 570; 455/2, 6.2, 6.3, 5.1, 6.1, 186.1; 725/46, 45, 44, 39, 53; 386/83

(56) References Cited

U.S. PATENT DOCUMENTS

| | | | | |
|---|---|---|---|---|
| 4,706,121 A | | 11/1987 | Young | 358/142 |
| 4,959,720 A | * | 9/1990 | Duffield et al. | 348/731 |
| 5,045,947 A | | 9/1991 | Beery | 358/192.1 |
| 5,191,423 A | * | 3/1993 | Yoshida | 348/731 |
| 5,210,611 A | * | 5/1993 | Yee et al. | 348/473 |
| 5,223,924 A | * | 6/1993 | Strubbe | 348/1 |
| 5,410,344 A | * | 4/1995 | Graves et al. | 725/46 |
| 5,410,367 A | * | 4/1995 | Zahavi et al. | 348/725 |
| 5,507,021 A | * | 4/1996 | Siegle | 455/158.4 |
| 5,523,800 A | * | 6/1996 | Dudek | 348/734 |
| 5,539,479 A | * | 7/1996 | Bertram | 348/564 |
| 5,583,560 A | * | 12/1996 | Florin et al. | 348/7 |
| 5,592,551 A | * | 1/1997 | Lett et al. | 380/20 |
| 5,625,422 A | * | 4/1997 | Kim | 348/732 |
| 5,631,707 A | * | 5/1997 | D'Errico | 348/461 |
| 5,635,989 A | * | 6/1997 | Rothmuller | 348/563 |
| 5,649,285 A | * | 7/1997 | Cautley | 455/6.2 |
| 5,671,411 A | * | 9/1997 | Watts et al. | 348/906 |
| 6,133,909 A | * | 10/2000 | Schein et al. | 345/327 |

* cited by examiner

*Primary Examiner*—John Miller
*Assistant Examiner*—Johnny Ma
(74) *Attorney, Agent, or Firm*—John T. Whelan; Michael Sales

(57) ABSTRACT

A method and apparatus for generating a database in a memory. Program identifying information is received from a service provider, the program identifying information comprising at least one service provider search criteria and information describing a channel on which a program is transmitted. A database is generated in a memory as a function of the channel identifying information and at least one of the service provider search criteria. Preferably, user-input search criteria is also received and it is determined whether the user-input search criteria corresponds to the service provider search criteria. A channel identified by the channel identifying information is selected if the user-input search criteria corresponds to the service provider search criteria.

3 Claims, 3 Drawing Sheets

| (a) Chan. Num. | (b) Call Sign | (...) | (n-1) | (n) | (n+1) | (...) |
|---|---|---|---|---|---|---|
| 02 | ABC | | | 111 | | |
| 20 | BET | | | 127 | | |
| 21 | BRAV | | | 1618 | | |
| 39 | CBS | | | 117 | | |
| 19 | CNN | | | 155 | | |
| 38 | COM | | | 155 | | |
| 18 | CRT | | | 167 | | |
| 22 | CSN | | | 175 | | |
| 03 | DIS | | | 2371 | | |
| 17 | DISC | | | 2371 | | |
| 36 | E! | | | 20 | | |
| 37 | ESPN | | | 2765 | | |
| 16 | FAM | | | 215 | | |
| 23 | FLIX | | | 2438 | | |
| 04 | FOX | | | 258 | | |
| 35 | GOLF | | | 3542 | | |
| 15 | HBO | | | 315 | | |
| 05 | HGTV | | | 3378 | | |
| 24 | HIST | | | 3377 | | |
| 40 | HLN | | | 345 | | |
| 06 | HSN | | | 375 | | |
| 34 | HTS | | | 377 | | |
| 14 | IFC | | | 321 | | |
| 25 | LIFE | | | 4322 | | |
| 33 | MAX | | | 518 | | |
| 07 | MTV | | | 578 | | |
| 41 | MUCH | | | 5713 | | |
| 26 | NBC | | | 511 | | |
| 13 | NICK | | | 5314 | | |
| 32 | SCFI | | | 7123 | | |
| 42 | SHO | | | 735 | | |
| 27 | TBS | | | 717 | | |
| 08 | TCM | | | 715 | | |
| 43 | TLC | | | 741 | | |
| 12 | TMC | | | 751 | | |
| 31 | TNN | | | 755 | | |
| 09 | TNT | | | 757 | | |
| 11 | TOON | | | 7555 | | |
| 28 | TRAV | | | 7618 | | |
| 44 | TRIO | | | 7635 | | |
| 29 | TWC | | | 781 | | |
| 10 | USA | | | 771 | | |
| 30 | VH1 | | | 831 | | |

Figure 2.

METHOD OF AND APPARATUS FOR GENERATING AND SEARCHING A DATABASE

BACKGROUND OF THE INVENTION

1. Field of the Invention

The present invention relates generally to a method and apparatus for to generating a database which occurs transparently to the user and, more specifically, to a method of and apparatus for searching the database and for selecting a desired channel therefrom by inputting alphanumeric search criteria, such as a call-sign identifying the desired channel.

2. Description of Related Art

Systems are known in the art whereby a user can search a database and make selections therefrom by inputting alphanumeric information. For example, in many businesses having telephone voice mail, a caller who calls after normal working hours is greeted by an automated message system. If the caller does not know the telephone extension of the party he is calling, the caller may press keys on the keypad of the phone which correspond to the letters of the last name of the called party. Once enough letters of the last name have been input by the caller so that the name is recognized, the extension associated with that name is selected and dialed.

In the field of subscription television, there also has been proposed a method for selecting desired television channels using an alphanumeric call-sign of the desired channel. For example, U.S. Pat. No. 5,045,947 to Beery relates to a television receiver and remote control device, at least one of which contains a ROM in which a lookup table is stored. The numeric keypad on the remote control device also includes alphanumeric characters (like a touch-tone telephone keypad). According to Beery, the user manually programs the ROM to fill in the lookup table with all information necessary for the user to select any available channel. For example, assume that the user wishes to select the channel on which the "Cable News Network" is located. The user must first program into the ROM the call sign associated with the desired program, i.e., "CNN". The user must then determine, using a conventional television guide or the like, the channel on which the desired program, e.g., "CNN", is being transmitted. Next, the user must program into the ROM the number of the channel corresponding to "CNN".

This requirement of Beery presents a substantial problem to the user, however, especially in view of the television satellite broadcast systems available today, in that the user must determine and program into the ROM the alphanumeric key sequence of the call sign and corresponding channel number for each of the several hundred available programs. This is not only very time consuming to the user, but also is prone to error in the transcription or entry of the data by the user into the ROM.

Accordingly, there exists in the art a need for a method and apparatus for generating a database which occurs transparently to the user. There further exists a need for a method of and apparatus for searching the database and for selecting a desired channel therefrom by inputting alphanumeric search criteria, such as a call-sign identifying the desired channel.

SUMMARY OF THE INVENTION

The present invention provides a method of and apparatus for generating a database which occurs transparently to the user and further provides a method of and apparatus for searching the database and for selecting a desired channel therefrom by inputting alphanumeric search criteria, such as a call-sign identifying a desired channel. More specifically, as broadly described herein, the present invention relates to a method and apparatus for generating a database in a memory comprising the steps of receiving program identifying information from a service provider, the program identifying information comprising service provider search data and information describing a channel on which a program is transmitted, and generating in a memory a database as a function of the channel identifying information and at least some of said service provider search data. Preferably, the present invention further comprises the steps of receiving user-input search criteria, parameters, determining whether the user-input search data corresponds to the service provider search criteria, and selecting a channel identified by the channel identifying information if the user-input search criteria corresponds to the service provider search criteria.

In accordance with a second preferred embodiment of the present invention, there are provided a method and apparatus for selecting a desired channel comprising the steps of receiving program identifying information from a service provider, the program identifying information comprising service provider search data and information identifying the channel on which the program is transmitted, receiving user-generated search criteria, comparing the service provider search data with the user-generated search criteria, and selecting a channel corresponding to the program identifying information if the service provider search data corresponds to the user-generated search criteria.

As described in detail below, the method and apparatus of the present invention provide important advantages. For example, because the program identifying information is received from the service provider, the present invention eliminates the need for the user to manually compile and program into a memory a lookup table to effect the selection of desired channels. Moreover, the present invention permits the generation and searching of a database on the basis on any of a plurality of alphanumeric search criteria, thus providing heretofore unavailable flexibility to the user.

Other objects and advantages of the present invention will be readily apparent from the following description, the accompanying drawings, and the appended claims.

BRIEF DESCRIPTION OF THE DRAWINGS

FIG. 2 is an illustration of the layout of a keypad provided on a remote control device for use with the IRD of FIG. 1.

DETAILED DESCRIPTION OF THE INVENTION

Figure 1:
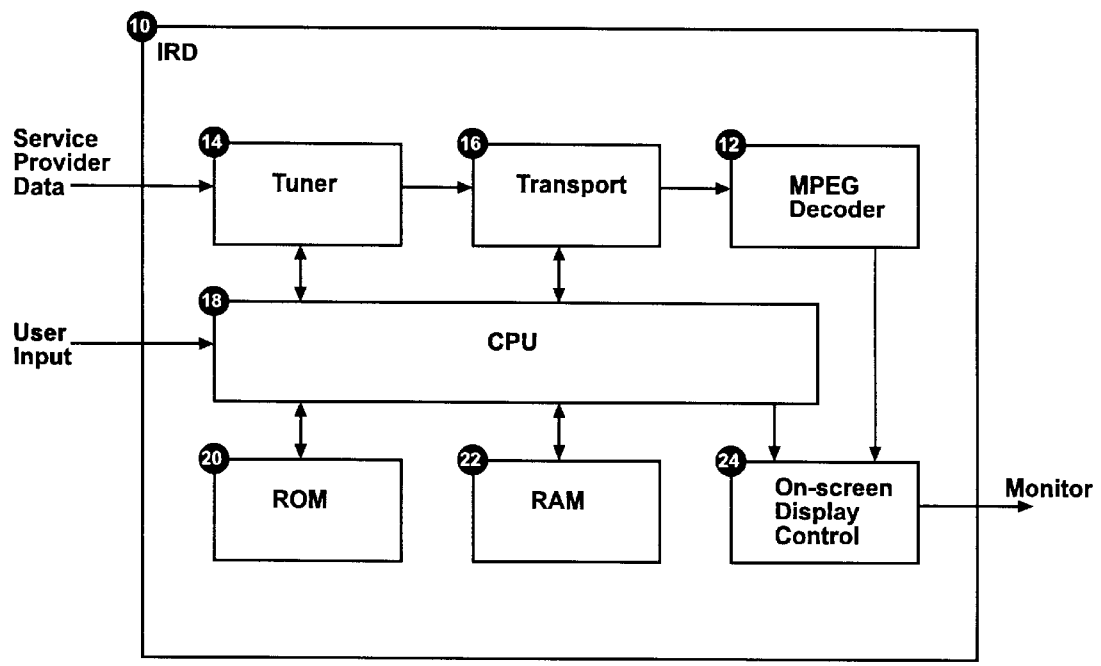
FIG. 1 is a block diagram of key components of an integrated receiver/decoder (IRD) for use in connection with the present invention.

The present invention relates to a method and apparatus for generating a database using program identifying information. The specific source or sources of the program identifying information, hereinafter collectively referred to as the "service provider", is not critical to the practice of the present invention. For example, the service provider may comprise cable television programming, off-air broadcasts, internet service providers, and data service providers, such as America On Line and Compuserve, as well as other sources, such as conventional computer diskettes, ROMs and the like, as will be appreciated by those of ordinary skill in the art. For ease of illustration, and by way of example only, the present invention will be described in the context of a television satellite broadcast service provider, such as DIRECTV®.

Similarly, the "user" of the present invention may be a viewer who wishes to watch the programming of a television satellite broadcast or other service provider on a conventional television set coupled to a satellite receiver, but the present invention is not so limited. The present invention also applies to users of videocassette recorders, appropriately-equipped personal computers, or any other apparatus capable of tuning a television signal from a multiple channel source, as will be appreciated by those of ordinary skill in the art.

As used herein, the term "transmitted" will be used to collectively refer to the means by which program information and program identifying information are provided from the service provider to the user. Transmitted may include, for example, satellite broadcast, cable transmission, off-air broadcast, or the like, or may simply refer to the loading of a computer diskette or ROM.

In addition to audio and video program information, which is ultimately displayed to the user, the various channels transmitted by the service provider preferably also contain additional information, which may be broadly defined as "program identifying information". Program identifying information may include, for example, various "service provider search data", which are received from the service provider and which may be used, for example to compile a user program guide. Examples of service provider search data include the following data group alphanumeric call sign of the program transmitted on a particular channel, the title of the program being transmitted, a brief description of the program, the rating of the program, a listing of particular performers appearing in the program, the type of program (e.g., sports, news, comedy, etc.), keywords associated with the program, whether or not the program is available in closed caption format, etc. Of course, other service provider search data may be provided as well, as will be apparent to those skilled in the art. The program identifying information preferably also includes information identifying the channel number of the transmitted program information. The program identifying information is not limited to information provided by a single service provider, but instead may be compiled from a variety of different service providers.

In the television satellite broadcast environment, the program information and program identifying information may be transmitted by the service provider from a central facility using a plurality of different transponders, each of which is capable of simultaneously transmitting a number of different channels. More specifically, multiple transponders preferably are provided in a satellite (not shown) and are utilized to transmit program information and program identifying information from the service provider, via the satellite, to the user.

The program information and program identifying information are transmitted from the service provider to the user in a transparent manner. That is, the program identifying information is not displayed in any audible or visual format to the user, nor is the user receiving the program identifying information s capable of discerning any noticeable effect of the receipt of the program identifying information on the display of the program information. Further, no action on the part of the user is necessary to receive the program identifying information; it is routinely and regularly transmitted by the service provider.

FIG. 1 is a block diagram illustrating key components of an integrated receiver/decoder (IRD) 10, which may be used in connection with the practice of the present invention. Of course, as discussed above, just as the present invention is not limited to the use of particular receiving/tuning apparatus, neither is the present invention limited to the use of an IRD.

IRD 10 preferably comprises at least a tuner 14, a transport chip 16, an MPEG chip 12, a central processing unit ("processor") 18, a ROM 20, a RAM 22, and an on-screen display control unit 24. Tuner 14 may be of known construction, as will be apparent to those of ordinary skill in the art. Tuner 14 receives program information and program identifying information from the service provider (not shown), as illustrated in FIG. 1, and selects the particular transponder and channel to tune to, as controlled by processor 18. The output of the tuner 14 is coupled to transport chip 16, which also may be of known construction. Transport chip 16 preferably comprises a channel demultiplexer By (not shown) for demultiplexing the channels received from tuner 14 into their respective components (audio and video program information, program identifying information, etc.). Transport chip 16 is also coupled to processor 18 with which program identifying information and the like may be passed.

Program information (audio and video) is output from transport chip 16 to MPEG chip 12, MPEG chip 12 may, for example, be Part No. 64002, manufactured by LSI Logic. MPEG chip 12 preferably comprises a video decoder (not shown), an audio decoder (not shown), and an on-screen display generator (also not shown), as will be understood by those of ordinary skill in the art. The output of the on-screen display generator of MPEG chip 12 is output to on-screen display control unit 24, which, under the control of processor 18, controls the display of the program information to the user on a conventional television or computer monitor, or the like (not shown).

In addition to tuner 14, transport chip 16, and on-screen display control unit 24, processor 18 is also coupled to ROM 20 and RAM 22. ROM 20 and RAM 22 may be any of a number of known memories, as will be apparent to those of ordinary skill in the art. Processor 18 also may be accessed by the user via a remote control device, keyboard, mouse, or the like (not shown).

In operation, program information and program identifying information is transmitted by the service provider and received by tuner 14 of IRD 10. After tuning to the desired transponder and channel, tuner 14 passes the received program information and program identifying information to transport chip 16. Transport chip 16 filters the program information from the program identifying information. The program information is then passed to MPEG chip 12 and the program identifying information is passed to processor 18.

The processing of the program identifying information received from the service provider will now be described in detail. According to a first preferred embodiment of the present invention, processor 18 receives the program identifying information from the service provider (via the respective components of IRD 10), and generates a database in RAM 22 as a function of the information identifying the channel on which the program is transmitted and at least some of the service provider search data. More particularly, referring to FIG. 2, information identifying the channel on which the program information is transmitted, which is received by processor 18 as part of the program identifying information passed by transport chip 16, may be loaded by processor 18 into RAM 22. See column (a) of FIG. 2. In addition, any of the service provider search data, which also is received by processor 18 as part of the program identifying information passed by transport chip 16, may also optionally be loaded into RAM 22 (see columns (b) through (n−1)). For example, if desired, in addition to the channel identifying information (column a), RAM 22 also may be loaded with the alphanumeric call sign associated with the program information (see column b). Of course, the particular service provider search data which are loaded into RAM 22 by processor 18 may vary, and may also be changed from time to time by the user.

ROM 20 is loaded with the following conversion table:

TABLE 1

| |
|---|
| A, B, C, 1 = 1 |
| D, E, F, 2 = 2 |
| G, H, I, 3 = 3 |
| J, K, L, 4 = 4 |
| M, N, O, 5 = 5 |
| P, Q, R, 6 = 6 |
| S, T, U, 7 = 7 |
| V, W, X, 8 = 8 |
| Y, Z, 9 = 9 |
| &, !, / (all symbols), 0 = 0 |

Processor 18 is programmed to convert any of the desired alphanumeric service provider search data to converted service provider search data according to the conversions of Table 1 stored in ROM 20. The converted service provider search criteria is then stored in RAM 22 (see columns (n), (n+1), etc.) For example, referring to column (n), it can be seen that stored in RAM 22 are the converted service provider search data associated with each of the call signs listed in column (b). It should be noted that, in practice, although it is possible, it is unlikely that the actual call signs or other service provider search data will be stored in RAM 22 in their unconverted form. Instead, under the control of processor 18, RAM 22 will store some of the service provider search data converted into a numerical sequence according to the conversion of Table 1 in ROM 20.

Figure 3:
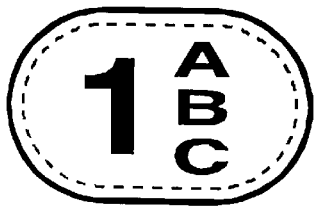
FIG. 3 is a listing of exemplary data which may be generated and stored in a memory of the IRD of FIG. 1.
Figure 3:
Figure 3:
Figure 3:
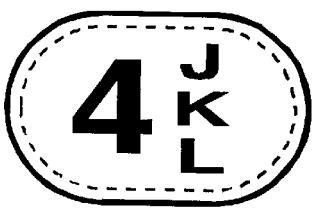
Figure 3:
Figure 3:
Figure 3:
Figure 3:
Figure 3:
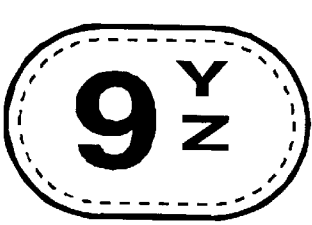
Figure 3:
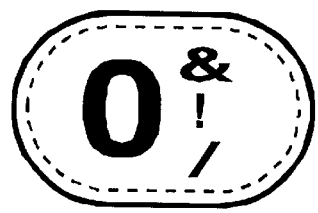
Figure 3:
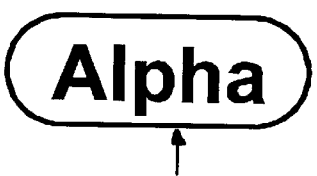

The user, via the remote control device, keyboard, mouse, or the like, inputs user-input search criterial parameters to processor 18. For illustrative purposes only, it will be assumed that the user is using a remote control device. Referring to FIG. 3, there is shown an exemplary keypad 26, which preferably is provided on the remote control device. As can be seen, the number keys of keypad 26, numbered 0 through 9, are each provided with associated alphanumeric characters, according to Table 1.

Keypad 26 is also provided with an "alpha" key 28. Alpha key 28, when pressed by the user, transmits a signal to IRD 10 which indicates that the following characters input by the user are to be processed in a special manner by processor 18, as described in more detail below.

If the user knows the number of the channel he wishes to select, then the user may simply press the numbers of the desired channel, without pressing alpha key 28. The desired channel is thus selected in a conventional manner. If the user first presses alpha key 28, however, the following characters input by the user (i.e., the "user-input search criteria") are received by processor 18 and cached in RAM 22. Next, under the control of processor 18, it is determined whether the user-input search criteria correspond with the service provider search data. Specifically, processor 18 compares the user-input search data with the converted service provider search criteria stored in RAM 22 (columns (n), (n+1), etc.). If processor 18 determines that there is correspondence between a given user-input search criteria and service provider search data, then the number of the channel associated with the service provider search criteria (i.e., RAM 22, column (a)), is selected.

It should be pointed out that the meaning of the term "selected" as used herein may vary. If a channel is selected, that is, processor 18 determines that the user-input search data corresponds to the service provider search data, then any one of several events may occur, as determined by the user. For example, selecting a channel may result in processor 18 instructing tuner 14 to tune to the selected channel. Alternatively, selecting a channel may effect the programming of an associated videocassette recorder to that channel, the adding or subtracting of the selected channel to a favorite program list, the tagging of the selected channel for later display on the monitor, etc., as will be apparent to those of ordinary skill in the art.

As mentioned above, alpha key 28 signals the processor 18 that the following key sequence comprises user-input search criteria. Optionally, multiple alpha keys 28 may be provided on keypad 26 to specify to the processor 18 the particular type of user-input search criteria to follow. For example, depressing a first alpha key 28 would inform processor 18 that the following user-input search criteria represents the call sign of a desired program, while depressing a second alpha key 28 (not shown) would inform processor 18 that the following user-input search criteria represents. A third alpha key 28 (also not shown) could signal the input of a desired performer's name, etc. Alternatively, a single alpha key 28 could be provided on keypad 26, and pressed multiple times. Pressing alpha key 28 once would signal the input of the call sign of a desired program, while pressing alpha key 28 twice would signal the input of a title of a desired program, and so on.

Reference is again made to FIG. 2. It is noted that the converted service provider search criteria corresponding to the call signs, "CNN" and "COM" are both "1, 5, 5". As a result, regardless of which of these channels the user wishes to select, pressing the alphanumeric keys on keypad 26 that are associated with the respective call signs will result in the same user-input search criteria, i.e., "1, 5, 5", being transmitted from the remote control device to processor 18. Processor 18 can be programmed to respond to such a situation in any of several different ways. For example, if the user-input key sequence "1, 5, 5" is received by processor 18, processor 18 may be programmed to select the channel with the number closest to the number of the channel presently selected, the next highest numerical channel number from the presently selected channel, or the like. Alternatively, processor 18 may command on-screen display control 24 to prompt the user via the monitor or the like to indicate which channel he wishes to select.

Similarly, there may exist more than one channel wherein one call sign is a subset of the other. For example, referring again to FIG. 2, consider the Disney Channel, "DIS", and the Discovery Channel, "DISC". If the user wishes to select the Disney Channel, he would press alpha key 28, followed by the user-input search criteria, "2, 3, 7". Associated with the Discovery Channel, however, is the search data, "2, 3, 7, 1". Accordingly, processor 18 will not recognize the user-input search data, "2, 3, 7", as corresponding to any service provider search data stored in RAM 22, because of the presence of the both the Disney Channel and the Discovery Channel. In such a case, there may be provided on keypad 26 a key (not shown) which would signify to processor 18 that the full user-input search criteria has been input by the user. Processor 18 would then recognize that the user-input search criteria, "2, 3, 7", represents the entire user-input search criteria and thus select the Disney Channel.

According to a second preferred embodiment of the present invention, no database need be generated in RAM 22. Instead, as described above, the user may input, using the remote control device, keyboard or the like, any desired user-input search criteria. For example, assume that the user would like to view The Weather Channel, which has the call sign, "TWC". The user would first depress "alpha" key 28, indicating that the following characters represent user-input search criteria. Next, the user would enter the user-input search criteria, "7, 8, 1", corresponding to the letters of the call sign. The user-input search criteria is then received by processor 18 and cached in RAM 22. As program identifying information is received from the service provider, the service provider search data is converted by processor 18 into its alphanumeric equivalent according, for example, to the conversion information stored in ROM 20, as discussed above. The key sequence corresponding to the converted service provider search data is then also cached in RAM 22. Processor 18 then performs a comparison of the converted service provider search data with the user-input search criteria to determine if there is any correspondence. If processor 18 determines that the service provider search data corresponds to the user-input search criteria, then the channel identified by the channel identifying information associated with the service provider search data is selected. If the service provider search data does not correspond to the user-input search data, then the converted service provider search criteria is erased from the cache and replaced by the converted service provider search data associated with the next program identifying information received by processor 18.

Because of the rate at which the available programs are received from the service provider, either over the satellite broadcast, cable television or the like, the time necessary for processor 18 to perform these comparisons is nominal, e.g., less than one second. Even in the worst case scenario, when the user must wait for receipt of substantially all of the available program identifying information before the desired channel is received (and a correspondence is detected by processor 18), the processing time should not exceed approximately two seconds. In such a manner, the space in RAM 22 necessary to store all available service provider search data and channel identifying information is avoided, without any noticeable effect to the user.

If no correspondence between the user-input search criteria and the service provider search data is detected, then the user-input search criteria may remain cached in the RAM 22 and compared to future service provider search data as a background task. For example, assume that the user wants to select movies in which Clint Eastwood stars and further assume that the next movie in which Mr. Eastwood stars will not be transmitted for two weeks. In such a case, the user selects alpha key 28 followed by the user-input search criteria, "2, 1, 7, 7, 8, 5, 5, 2", which corresponds to "E-A-S-T-W-O-O-D". Further assume that the next movie received from the service provider stars Rodney Dangerfield, which has the converted service provider search data, "2, 1, 5, 3, 2, 6, 2, 3, 2, 4, 2". This converted service provider search data is calculated by processor 18 and stored in RAM 22. Processor 18 then compares the service provider search data with the user-input search criteria input by the user. Because no correspondence therebetween is detected by processor 18, the process continues with the next program identifying information received from the service provider. This task is preferably performed by processor 18 as a background task, so as not to interfere with other higher priority tasks being performed.

While the methods described herein, and the apparatus for carrying these methods into effect, constitute preferred embodiments of the present invention, it should be recognized that changes may be made therein without departing from the spirit or scope of the present invention, which is defined in the appended claims. For example, the search criteria input by the user need not be alphanumeric data, but may be speech or other data, or the like, using appropriate conversion and recognition schemes.

What is claimed is:

1. A method comprising:
    automatically receiving, by an apparatus for receiving a television signal, program identifying information for identifying a program transmitted by the television signal:
    converting the program identifying information to search criteria:
    inputting a user request for comparison to the program identifying information;
    comparing the user request input in said inputting step to the program identifying information received in said receiving step; and
    repeating the comparing step after repeating the receiving step in the event that no correspondence between the user request and the program identifying information is found in said comparing step, wherein said receiving step comprises receiving the program identifying information via satellite;
    wherein if there is more than one identical match in the comparison between the user request and the program identifying information, a channel is automatically selected from the more than one identified channels.

2. A method according to claim 1, wherein the automatically selected channel is the next highest numerical channel.

3. A method according to claim 1, wherein the automatically selected channel is the number closest to the number of the channel presently selected.

* * * * *